(12) United States Patent
Grealish et al.

(10) Patent No.: US 8,515,390 B2
(45) Date of Patent: Aug. 20, 2013

(54) SYSTEM AND METHOD FOR PROTECTING DATA IN WIRELESS DEVICES

(75) Inventors: Colin Grealish, Brighton (GB); Badri Nath, Edison, NJ (US); Rakesh Kushwaha, Marlboro, NJ (US)

(73) Assignee: Mformation Software Technologies, Inc., Edison, NJ (US)

( * ) Notice: Subject to any disclaimer, the term of this patent is extended or adjusted under 35 U.S.C. 154(b) by 924 days.

(21) Appl. No.: 11/868,345

(22) Filed: Oct. 5, 2007

(65) Prior Publication Data

US 2009/0093235 A1    Apr. 9, 2009

(51) Int. Cl.
*H04M 1/66* (2006.01)

(52) U.S. Cl.
USPC .......................................... 455/411; 455/410

(58) Field of Classification Search
USPC . 455/410–411, 418–420, 435.1, 414.1–414.2
See application file for complete search history.

(56) References Cited

U.S. PATENT DOCUMENTS

| | | | | |
|---|---|---|---|---|
| 5,809,413 | A * | 9/1998 | Meche et al. | 455/411 |
| 5,898,783 | A * | 4/1999 | Rohrbach | 340/5.31 |
| 6,741,851 | B1 * | 5/2004 | Lee et al. | 455/410 |
| 6,970,917 | B1 | 11/2005 | Kushwaha et al. | |
| 7,849,161 | B2 * | 12/2010 | Koch et al. | 709/219 |
| 7,865,172 | B2 * | 1/2011 | Blair et al. | 455/411 |
| 2002/0069259 | A1 | 6/2002 | Kushwaha et al. | |
| 2002/0112046 | A1 | 8/2002 | Kushwaha et al. | |
| 2002/0112047 | A1 | 8/2002 | Kushwaha et al. | |
| 2003/0065934 | A1 * | 4/2003 | Angelo et al. | 713/200 |
| 2004/0005875 | A1 * | 1/2004 | Ko et al. | 455/410 |
| 2004/0110488 | A1 * | 6/2004 | Komsi | 455/411 |
| 2007/0021112 | A1 * | 1/2007 | Byrne et al. | 455/419 |
| 2007/0111728 | A1 | 5/2007 | Jiang | |
| 2010/0009669 | A1 * | 1/2010 | Pirhonen et al. | 455/419 |

FOREIGN PATENT DOCUMENTS

| | | |
|---|---|---|
| EP | 1 376 377 A1 | 1/2004 |
| EP | 1 659 818 A1 | 5/2006 |
| EP | 1 696 359 A2 | 8/2006 |
| JP | 2001-510973 A | 8/2001 |
| JP | 2002-505056 A | 2/2002 |
| JP | 2006-279572 A | 10/2006 |

OTHER PUBLICATIONS

Japanese Patent Office, Office Action, Japanese Patent Application No. 2010-528009, Aug. 23, 2012.

(Continued)

*Primary Examiner* — Brandon Miller
(74) *Attorney, Agent, or Firm* — Brosemer, Kolefas & Assoc., LLC

(57) ABSTRACT

When a network-based wireless device such as a mobile phone or data terminal is reported lost or stolen or is determined to be malfunctioning, a service provider can immediately deny the device access to the network. However, any management operation to secure data carried by the wireless device cannot be carried out as the device is no longer reachable from the network. Therefore, the data should be secured before the device is rendered inoperable. Apparatus and methods are provided to back-up the data or wipe the data before the system denies access to the device. A system and method are provided by which a security manager works in conjunction with an equipment register of the network to lock and wipe data on the wireless device before the device is denied access to the network. Similarly, for a wireless device that is later recovered or determined to be operable, the device can be granted access to the network again and any data that was locked or wiped can be unlocked or restored over the network.

20 Claims, 5 Drawing Sheets

(56) References Cited

OTHER PUBLICATIONS

European Patent Office (EPO) as ISA, International Search Report and the Written Opinion of the International Searching Authority, International Patent Application No. PCT/US2008/060004, Feb. 11, 2009.

Response to Written Opinion of the IPEA, International Patent Application No. PCT/US2008/060004, Aug. 4, 2009.

USPTO as IPEA, International Preliminary Report on Patentability, International Patent Application No. PCT/US2008/060004, Apr. 19, 2011.

EPO, Communication Pursuant to Article 94(3) EPC, European Patent Application No. 08745586.1, Feb. 10, 2012.

Response to Article 94 Communication, European Patent Application No. 08745586.1, May 25, 2012.

* cited by examiner

SYSTEM AND METHOD FOR PROTECTING DATA IN WIRELESS DEVICES

FIELD OF THE INVENTION

The present invention relates to the field of wireless communication networks, and in particular to protecting data in wireless devices, such as wireless data terminals, mobile phones or the like.

BACKGROUND INFORMATION

Network-based mobile wireless devices, such as wireless data terminals and mobile phones, among others, connect to a wireless network that facilitates communication among wireless devices. The core wireless network includes base stations, switching elements, and databases. These databases are used for call control and network management. For example, one such database, the Home Location Register (HLR), stores subscriber information as well as the current locations of subscribers. Similarly, the Equipment Identity Register (EIR) stores equipment data and state information. The EIR records the equipment identity (e.g., IMEI, ESN etc.) of all the devices that can be used in the network. The EIR can also maintain a "black list" of devices that are forbidden to use the network. Whenever a device attempts to connect to the network, the network can consult the EIR and deny service if the device's identity is found on the black list. The EIR could be a separate entity or could be collocated with the HLR.

With mobile wireless devices carrying increasing amounts of sensitive user data, when a device is lost or stolen, in addition to denying service, it may be necessary or desirable to secure any user data by locking out access to the device or erasing the data. Such actions are typically carried out by sending to the lost or stolen device one or more commands from a security module in a device management system associated with the device. Once a device is black listed, however, it is denied network access and it is not possible for the security module to reach the device for carrying out any such security operations. The security module must therefore carry out such operations before the device is black listed and denied access to the network.

There is therefore is a need for the EIR or the HLR in which the state of the device is stored to interact with the security manager of the device management system in order to ensure that any data in the device that is to be protected is secured before the device is black listed and denied access to the network.

SUMMARY OF THE INVENTION

The present invention provides a system and method to perform security operations on a wireless device prior to denying network access to the device. In accordance with an exemplary embodiment of the present invention, when a determination is made to deny network access to a wireless device, such as when the device is reported lost or stolen or is considered to be malfunctioning, security operations to secure the data on the device are executed by sending commands over the air prior to denying network access to the device. In one aspect of the present invention, the security manager or a device management system is informed that a device is reported stolen or lost. The security manager or device management system then determines the type of the wireless device and decides if there is a need to secure data on the device. If so, the security manager sends commands over the air to secure the data on the wireless device and instructs the Equipment Identity Register (EIR) or the Home Location Register (HLR) to move the device to a "black list" of devices to be denied network access. If the wireless device then attempts to connect to the network it will be denied access. The HLR and EIR can be combined or separate, and either or both can act as a repository for maintaining the status of wireless devices.

In an aspect of the present invention, a customer care unit or a device management system includes means to record the state of the device and communicate any change in status to the security manager for initiating security actions by communicating with the mobile wireless device.

In another aspect of the present invention, the security manager intercepts any messages that indicate that the wireless device is lost or stolen, and then performs any appropriate security operations. The security manager then sends a notification to the HLR or EIR to move the device onto a black list. When the device is moved to the black list, the device is denied access to the network.

In another aspect of the present invention, the security manager intercepts any messages that indicate that the wireless device has been recovered or is in good standing, and then performs any appropriate security operations. The security manager then sends a notification to the HLR or EIR to move the device onto a "white list." When the device is moved to the white list, the device is granted access to the network.

The security operations that may be performed prior to moving the wireless device to the black list may include, for example, data back-up, data wipe, and/or device lock operations. The security operations that may be performed prior to moving the wireless device to the white list may include, for example, data restore, and/or device unlock operations. The security operations can be carried out by sending commands over the air from the security manager or device management system to the wireless device.

The above and other aspects and features of the present invention will be apparent from the drawings and detailed description which follow.

DETAILED DESCRIPTION

Figure 1:
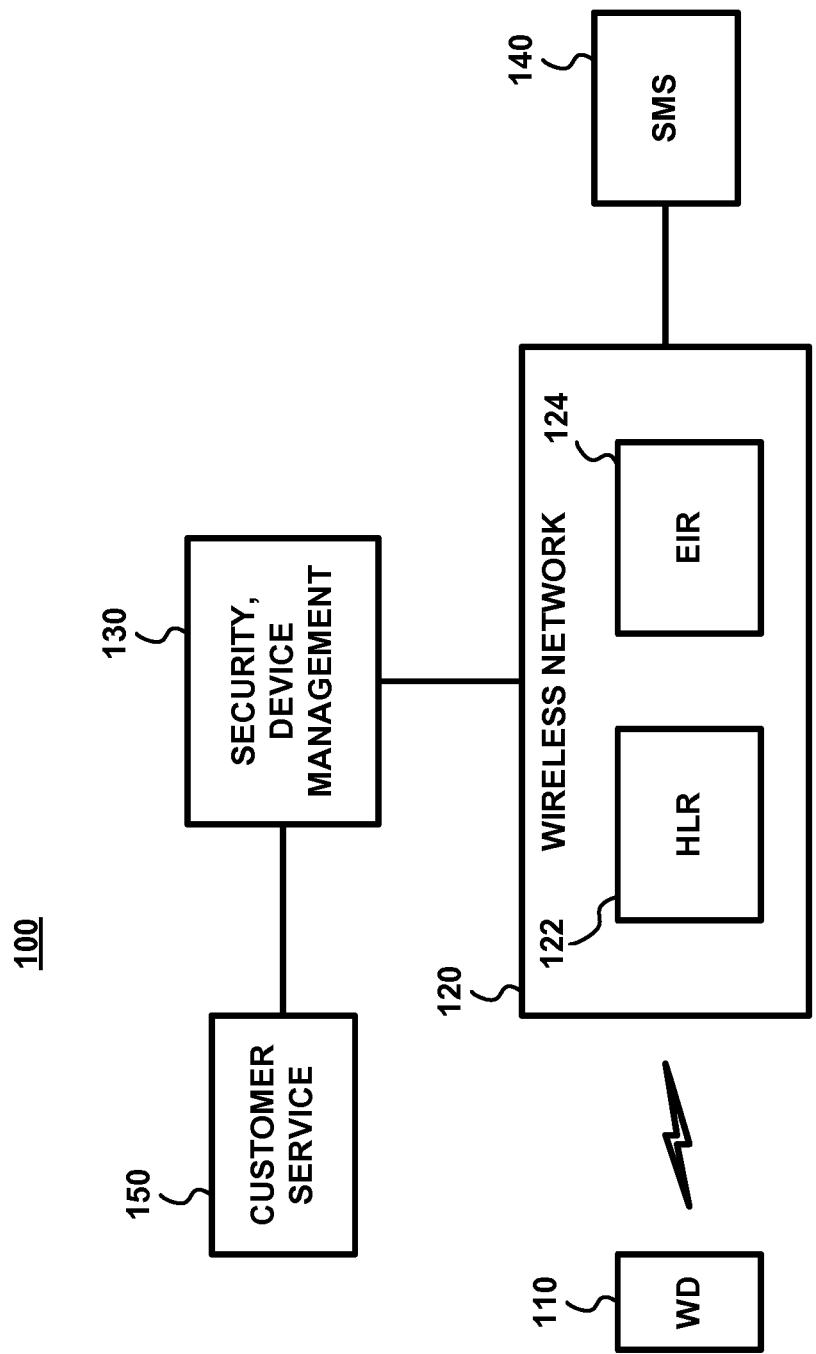
FIG. 1 is a block diagram of an exemplary mobile wireless communication system.

FIG. 1 is a block diagram of an exemplary mobile wireless communication system 100. For purposes of the present invention, the components of interest include one or more wireless devices (WD) 110, a wireless network 120, and a security and/or device management sub-system or systems, shown collectively as 130. Mobile wireless networks exemplified by networks such as GSM, CDMA, and WiMAX, among others, typically employ several databases for call control and network management. Among them are a Home Location Register (HLR) 122, a Visitor Location Register (not shown), and an Equipment Identity Register (EIR) 124. The EIR 124 registers equipment data by storing device identities, including, for example, the International Mobile Equipment Identity (IMEI), Electronic Serial Number (ESN), or Media Access Control (MAC) address of each wireless device 110.

The EIR 124 can be a separate entity or can be merged with the HLR 122. In any case, whether it be the HLR 122, EIR 124, or a combination thereof, a database in the system maintains several categories or lists for wireless devices that have been certified to operate in the networks. For convenience, it will be assumed herein that such a database is maintained by the EIR 124, although other arrangements may be possible within the scope of the present invention. A wireless device 110 may be included in a "white" list, or a "black" list maintained by the EIR, to allow the network to decide if the device should be granted or denied access to the network. The lists thus maintained can be used to control the access of wireless devices 110 to the wireless network 120.

Reasons for denying network access to a wireless device may include, for example: the device type has not been certified; the device has been reported as lost or stolen; the device is malfunctioning; or the device is being used by an unauthorized user. Reasons for granting network access to a wireless device may include, for example: the device type has been certified; the device has been recovered; or the device has been repaired.

For wireless devices carrying data that is to be protected, simply denying network access to such devices when they are reported lost or stolen, is usually insufficient to protect the data. For data contained in wireless devices to be protected, it should be secured by wiping the data or by locking access to the data.

A security management server or security manager 130, which may be part of a device management sub-system, is responsible for managing the security of a plurality of wireless devices 110. The security manager 130 will initiate the denial of network access for the wireless device 110 and will also carry out security operations involving the device, such as, for example, wiping or locking data carried by the device. Such operations are carried out by the security manager 130 via commands sent to the wireless device 110 over the wireless network 120. The wireless device 110 must therefore have network access in order to receive such commands from the security manager 130.

Systems and methods for remotely controlling and managing wireless devices are described in U.S. Pat. No. 6,970,917, and U.S. Patent Application Publications Nos. 2002/0069259, 2002/0112046, and 2002/0112047, each of which is incorporated herein by reference in its entirety.

In an exemplary embodiment of the present invention, the security manager 130 operates in conjunction with the EIR 124 (or HLR 122) to carry out security operations such as securing data in a wireless device 110. When the need arises to secure data on a wireless device 110, such as when it is reported lost or stolen, the security manager 130 can send the appropriate commands to the device 110 to wipe or lock the data to be secured. The EIR 124 can then be informed to change the status of the wireless device 110, i.e., to place the identity of the device on the aforementioned black list, whereby the device will be denied network access. Thus, the device can be locked and/or wiped prior to being denied access to the network.

Commands to secure data on a device (e.g., wipe and lock) can be sent to the wireless device as soon as it is reported as lost or stolen, provided the device is still connected to the network. In some cases, however, a wireless device will be disabled from accessing the network before it has been reported as lost or stolen or before any data-securing commands have been sent to the device. Such disablement can occur, for example, by removing the device's battery, and/or Subscriber Identity Module (SIM) or equivalent. In such a case, the security manager 130 can be triggered to send data-securing commands to the wireless device 110 as soon as the device attempts to connect to the network again. This would be done even if a different SIM has been inserted into the device. Thus, once a wireless device is flagged as lost or stolen, any attempt by the device to connect to the network will result in securing of the data thereon. After the data has been secured, the wireless device is then denied network access and rendered inoperable with the network.

The security manager 130 can communicate with the wireless device 110 via a Small Messaging Service (SMS) maintained by an SMS center or server 140. Using SMS, the security manager 130 can send commands to the wireless device 110 and receive acknowledgments or other information from the wireless device, as described below.

The security manager 130 can also communicate with a customer service entity 150, or the equivalent thereof. The customer service entity 150 can provide the security manager 130 with information regarding wireless devices, such as, for example, notifications that a wireless device has been reported as lost or stolen and is to be denied network access.

Figure 2:
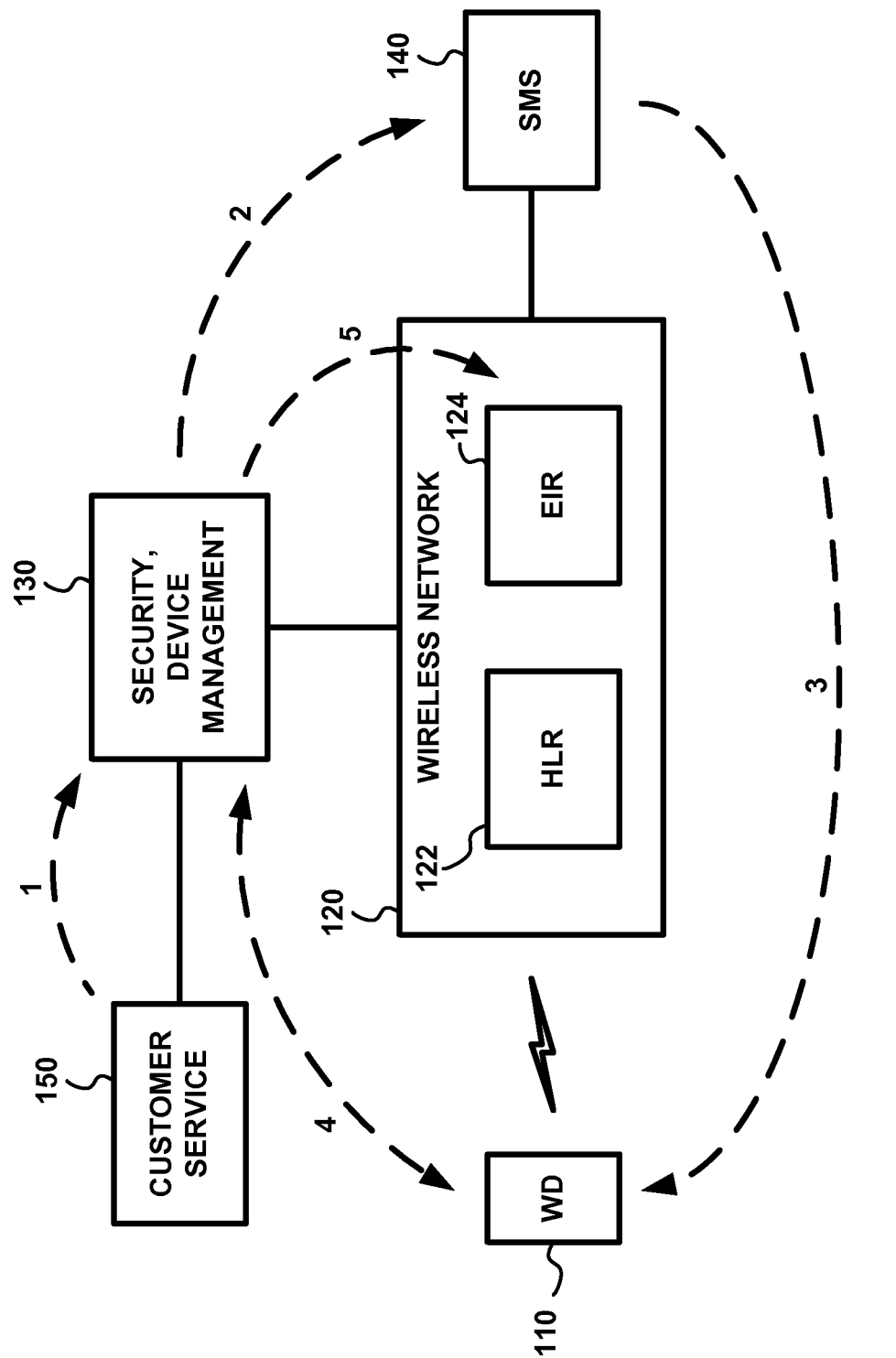
FIG. 2 is a block diagram that shows an exemplary sequence of actions taken by a security manager when a wireless device is denied access to the mobile wireless network, in accordance with the present invention

FIG. 2 is a block diagram illustrating an exemplary sequence of actions taken to secure data on a wireless device prior to denying network access to the device. First, as represented by arrow 1, an external entity 150 such as a customer care service, a self-portal (whereby a subscriber connects via the web to a subscriber portal), or the like, sends a notification to the security manager 130 that indicates that a wireless device has been lost or stolen. As shown by arrow 2, the security manager 130 then sends an SMS notification, via the SMS server 140, which in turn forwards the SMS notification (arrow 3) to the wireless device 110. The SMS notification requests the initiation of a session between the wireless device 110 and the security manager 130, which session is represented by double-headed arrow 4.

During the session, commands are sent from the security manager 130 to the wireless device 110 to secure data on the device. Data can be secured by locking access to or wiping the data. Once the data has been secured, the security manager 130 sends a message to the EIR 124 (arrow 5) to move the device to the black list. Devices on the black list are treated as suspended equipment and are denied access to the network.

Figure 3:
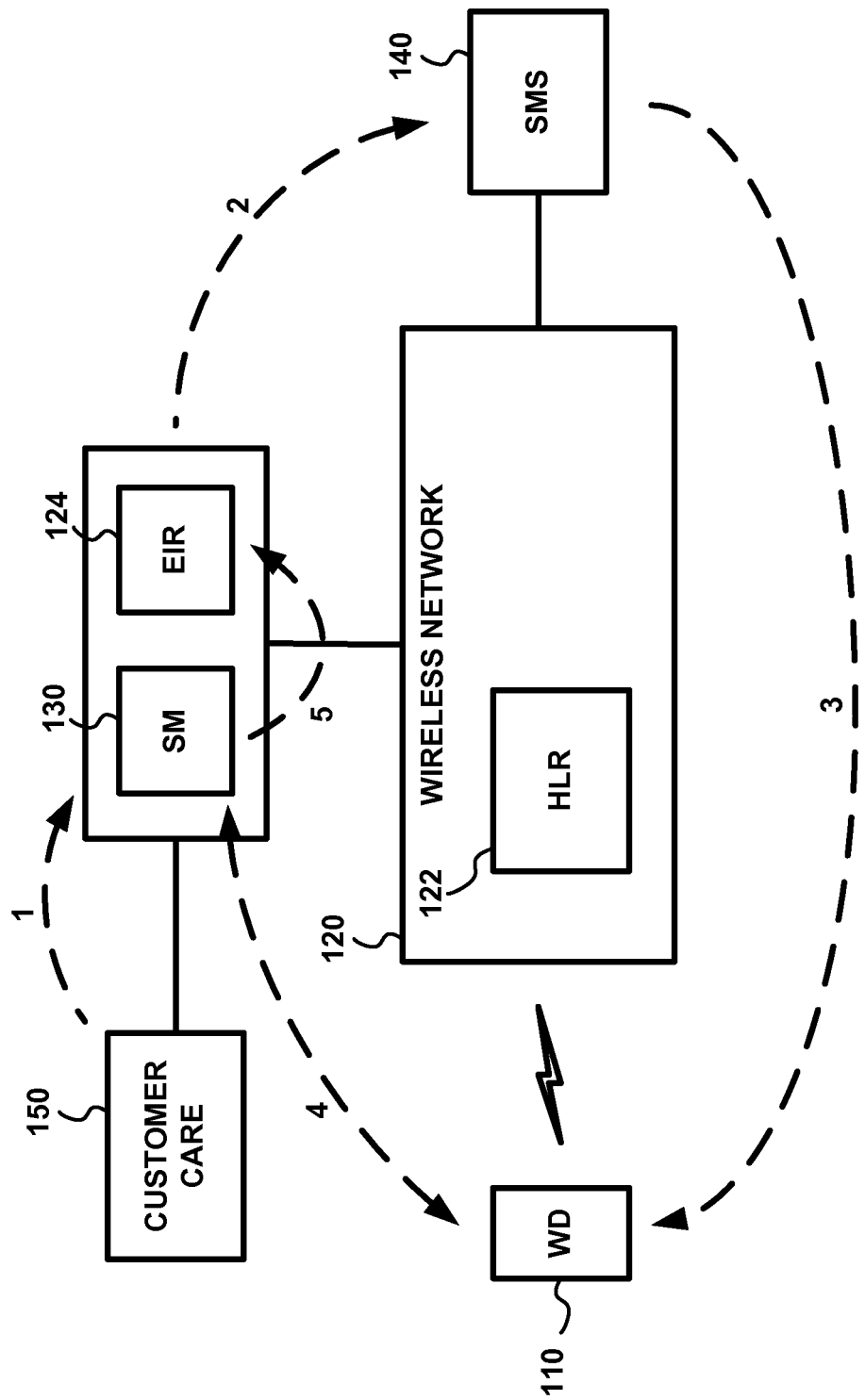
FIG. 3 is a block diagram that shows an exemplary sequence of actions taken by the security manager when a wireless device is granted access to the mobile wireless network, in accordance with the present invention.

While FIG. 2 shows the security manager 130 distinct from the EIR 124, the present invention contemplates embodiments in which the security manager or aspects thereof are combined with the EIR. FIG. 3 shows a block diagram in which the EIR 124 and the security manager 130 have been combined. The degree to which the security manager and EIR are combined may vary within the scope of the present invention. For example, the security manager and EIR can be physically combined and reside on the same physical host, and the security manager and EIR communicate using messages or procedure calls. In another exemplary embodiment, the security manager and EIR may reside on different physical hosts while being virtually combined, and the security manager and EIR communicate by sending requests over a network connection. As shown in FIG. 3, the sequence of actions is essentially the same as that shown in FIG. 2.

Figure 4:
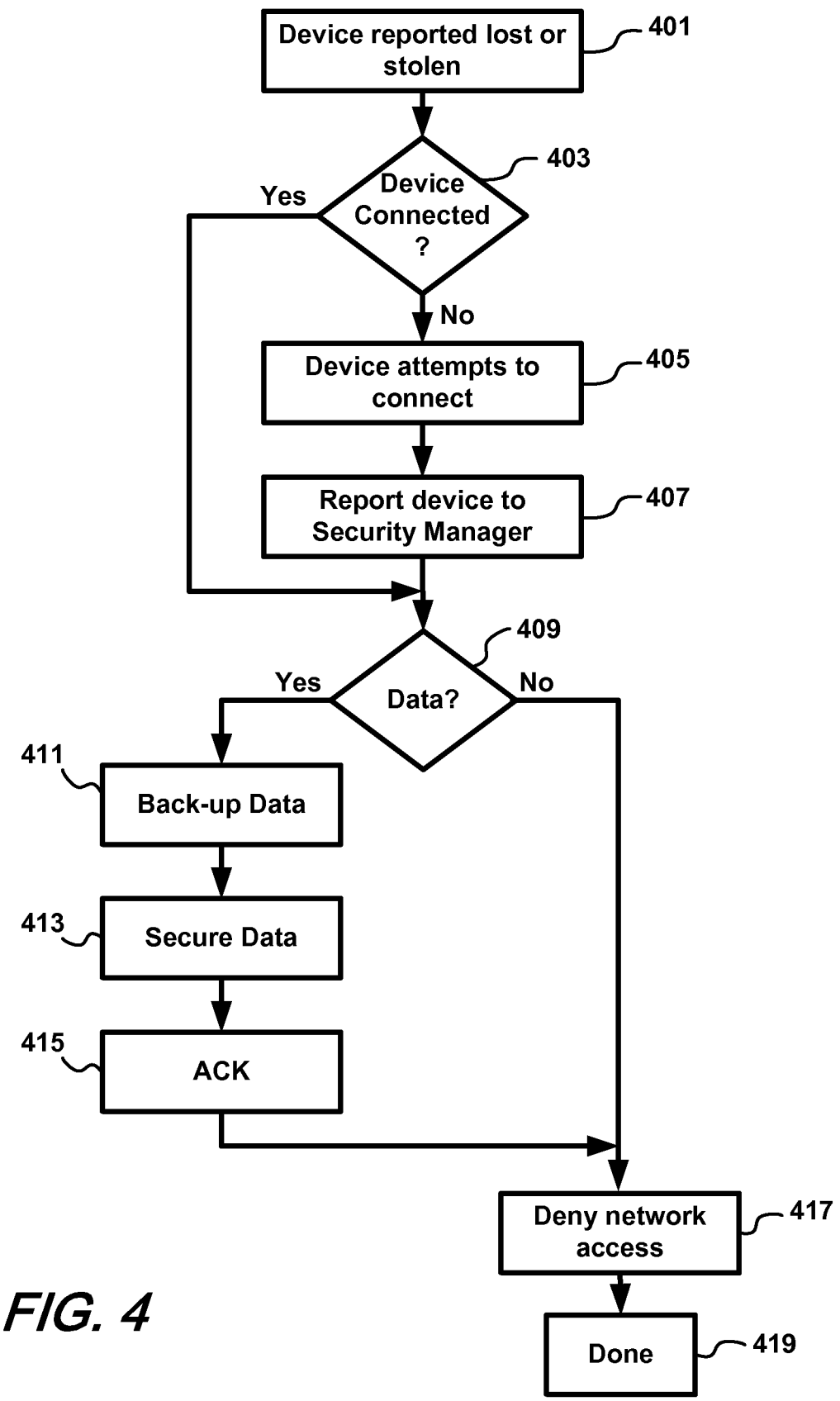
FIG. 4 is a flow chart illustrating the exemplary operation of the security manager prior to the wireless device being disconnected from the mobile wireless network, in accordance with the present invention.

FIG. 4 is a flow chart illustrating an exemplary method of securing data on a wireless device that has been reported as lost or stolen. At 401, a wireless device is reported as lost or stolen and the security manager is notified accordingly. Such notification will typically be sent by the customer service entity, or the like, and preferably provides the device identity of the device. At 403, if the device is connected to the network at the time security manager is notified of its status as lost or stolen, the method proceeds to 409, described below. If the device is not connected to the network, the method waits until the wireless device attempts to connect to the wireless network, at 405. When such an attempt to connect is made, the wireless network, at 407, notifies the security manager of the attempt and provides an identification of the wireless device. Said identification preferably comprises the device identity (e.g., IMEI, ESN, MEID, or MAC address) of the wireless device. The security manager can use the device identity to confirm that the device had been reported (at 401) as lost or stolen.

By using device-specific identification (i.e., the device identity), as opposed to subscriber-specific identification (e.g., the telephone number assigned to the device), even if a lost or stolen device attempts to re-connect to the network using a new SIM (or equivalent), the security manager will recognize the device as lost or stolen and will proceed accordingly.

Using the device identity, the security manager can determine, at 409, if the wireless device has data that is to be protected. The device identity can be used to determine if the wireless device is of a type that may contain sensitive data and if so, to protect any such data. The device identity can be used to look up further device information, which may include, for example, make, model, and device features, including data storage capabilities. Alternatively, the security manager, or other suitable entity such as customer service, can maintain a database of device identities of wireless devices which are to have data contained therein protected if they are reported as lost or stolen. Such a database may further specify which data or type of data carried by each wireless device is to be protected. In such an embodiment, a user can elect (e.g., via customer service) to enroll their device in a data protection arrangement in accordance with the present invention or can opt-out of such an arrangement, even if their device is of a type that is capable of containing data.

If it is determined at 409 that there is no data to be protected on the wireless device in question, the device is placed on the black list at 417 and thereby denied any further network access. If it is determined at 409 that the wireless device contains data that is to be secured, operation proceeds to 411-415 in which the security manager invokes commands over the air so that the data can be wiped or locked. Optionally, at 411, the data can be read out of the wireless device and backed-up by the security manager (or other suitable entity) before it is wiped or locked on the device. The backed-up data can later be restored to the wireless device once the device has been recovered, as described below. The backed-up data can be stored, for example, in a secure data repository which can be part of the security manager or separate. The data backed-up from a wireless device can be stored in the data repository under or accessible via the device's device identity, preferably.

Once the data has been locked or wiped at 413, the wireless device, preferably sends an acknowledgement message (ACK) at 415 back to the security manager to confirm that the data has been secured. The wireless device is then placed on the black list at 417 and denied network access. The method is done at 419.

Figure 5:
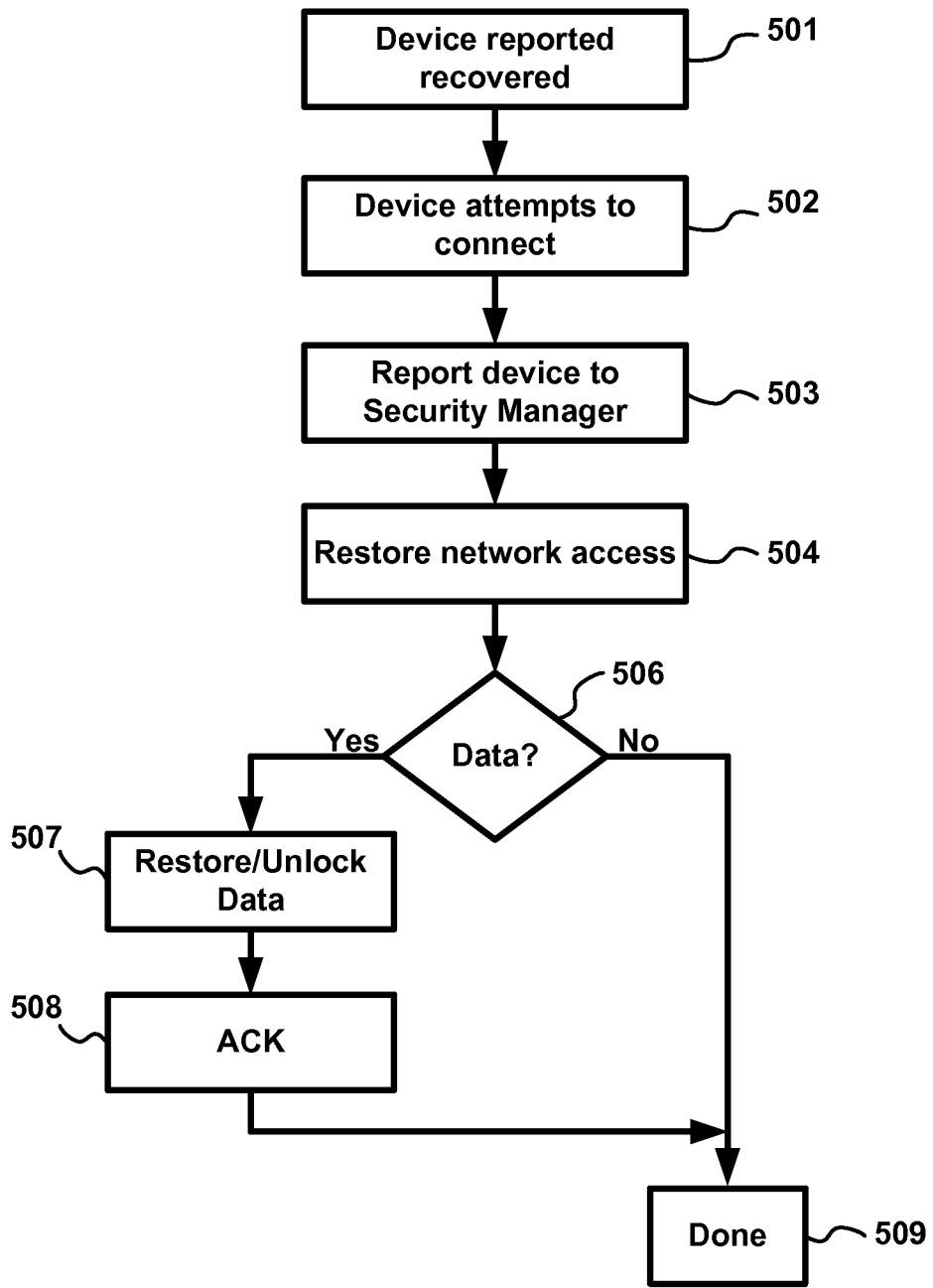
FIG. 5 is a flow chart illustrating the exemplary operation of the security manager after the wireless device is reconnected to the mobile wireless network, in accordance with the present invention.

FIG. 5 illustrates an exemplary method that is carried out when a wireless device that had been reported as lost or stolen and denied access to the network, such as described above, is recovered. At 501, the security manager is notified, such as by customer service or the like, that a wireless device that had been reported as lost or stolen has been recovered. Ostensibly, the device will have been previously black-listed and thus denied network access. At 502, the device attempts to re-connect to the wireless network and at 503 the wireless network reports the device's device identity to the security manager. At 504, the wireless device is placed on the white list and network access is restored to the device.

At 506, using the device identity of the recovered wireless device, the security manager can determine if there is any data that is to be restored to the wireless device or data on the wireless device that is to be unlocked. The security manager may check the above-mentioned data repository to determine if there is any data stored therein for the wireless device. If so, the data can be obtained from the data repository and restored to the wireless device. The security manager can also use the device identity to determine information such as the type of the device and its features to determine if it may be carrying data that is to be unlocked.

If it is determined at 506 that there is no data to restore to or unlock on the wireless device, no further processing is required and the procedure is done at 509. If there is data to be restored or unlocked, operation proceeds to 507 in which the security manager invokes commands over the air so that data can be restored or unlocked. Once the data has been restored or unlocked, the wireless device, preferably sends an acknowledgement message (ACK) at 508 back to the security manager to confirm. The procedure is done at 509.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of protecting data on a network-based wireless device comprising the steps of:
   (a) providing a security manager with an identification of the wireless device;
   (b) determining at the security manager whether the wireless device contains data that is to be protected;
   (c) sending from the security manager to the wireless device a command to secure the data that is to be protected;
   (d) securing at the wireless device the data that is to be protected;
   (e) receiving an acknowledgment at the security manager that the data has been secured; and
   (f) sending from the security manager a message for refusing network access to the wireless device,
   wherein steps (c), (d) and (e) are skipped if it is determined in step (b) that the wireless device does not contain data that is to be protected.

2. The method of claim 1, wherein the identification of the wireless device includes a device identity of the wireless device.

3. The method of claim 2, wherein determining whether the wireless device contains data that is to be protected includes using the device identity to check a database containing device identities of wireless devices having data to be protected.

4. The method of claim 1 comprising:
storing data that is to be protected before it is secured, wherein the data is stored in a data repository remote from the wireless device.

5. The method of claim 1, wherein securing the data that is to be protected includes at least one of locking the data and wiping the data.

6. The method of claim 1, wherein refusing network access to the wireless device includes placing the wireless device on a black list in an Equipment Identity Register (EIR).

7. The method of claim 6, wherein the security manager and the EIR are physically combined and reside on a common host.

8. The method of claim 7, wherein the security manager communicates with the EIR by sending requests using messages or procedure calls.

9. The method of claim 1, wherein the wireless device has been reported as lost or stolen.

10. The method of claim 1, wherein the security manager determines if the wireless device contains data to be protected by maintaining an inventory of data stored on each wireless device.

11. The method of claim 1, wherein the security manager and the EIR reside on different hosts.

12. The method of claim 11, wherein the security manager communicates with the EIR by sending requests over a network connection.

13. The method of claim 1, wherein the security manager communicates with the wireless device via a Small Messaging Service (SMS).

14. The method of claim 1 comprising the steps of:
determining whether data is to be restored to the wireless device;
permitting network access to the wireless device;
restoring data to the wireless device; and
receiving an acknowledgment at the security manager that the data has been restored.

15. The method of claim 14, wherein determining whether data is to be restored to the wireless device includes checking a data repository to determine whether the data repository contains data to be restored to the wireless device.

16. The method of claim 14 comprising:
storing in a data repository remote from the wireless device the data that is to be restored to the wireless device.

17. The method of claim 14, wherein restoring data to the wireless device includes sending one or more commands from the security manager to the wireless device via the network.

18. The method of claim 14, wherein permitting network access to the wireless device includes placing the wireless device on a white list in an Equipment Identity Register (EIR).

19. The method of claim 14, wherein the wireless device has been reported as recovered.

20. The method of claim 1, wherein a network identity associated with the wireless device is changed before step (c) is carried out.

* * * * *